(12) United States Patent
Miao

(10) Patent No.: US 9,250,493 B2
(45) Date of Patent: Feb. 2, 2016

(54) SHIELDING ASSEMBLY AND ELECTRONIC DEVICE EMPLOYING SAME

(71) Applicant: FIH (Hong Kong) Limited, Kowloon (HK)

(72) Inventor: Yi-Chieh Miao, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 14/066,848

(22) Filed: Oct. 30, 2013

(65) Prior Publication Data

US 2014/0313404 A1    Oct. 23, 2014

(30) Foreign Application Priority Data

Apr. 19, 2013   (HK) .................................. 102114098

(51) Int. Cl.
*H04N 5/225*  (2006.01)
*G02F 1/153*  (2006.01)
*G02F 1/137*  (2006.01)

(52) U.S. Cl.
CPC ............... *G02F 1/153* (2013.01); *G02F 1/137* (2013.01); *H04N 5/2254* (2013.01); *H04N 5/2257* (2013.01)

(58) Field of Classification Search
USPC .......................... 348/373, 375, 335; 396/475
See application file for complete search history.

(56) References Cited

U.S. PATENT DOCUMENTS

| | | | |
|---|---|---|---|
| 2005/0134721 A1* | 6/2005 | Ito ................................ | 348/363 |
| 2005/0168629 A1* | 8/2005 | Togawa et al. ................ | 348/375 |
| 2006/0077279 A1* | 4/2006 | Kang ............................ | 348/335 |
| 2011/0076005 A1* | 3/2011 | Guo ............................. | 396/457 |
| 2013/0169862 A1* | 7/2013 | Han et al. ..................... | 348/376 |

FOREIGN PATENT DOCUMENTS

CN         102033409 A   *   4/2011

* cited by examiner

*Primary Examiner* — Sinh Tran
*Assistant Examiner* — Zhenzhen Wu
(74) *Attorney, Agent, or Firm* — Novak Druce Connolly Bove + Quigg LLP

(57) ABSTRACT

An electronic device includes a camera module and a shielding assembly. The shielding assembly includes at least one window glass and a smart film mounted to the window glass. The shielding assembly covers the camera module by turning opaque. If the camera module is in use, the shielding assembly is provided with electricity, and changes transparent. If the shielding assembly is not being provided with electricity, the shielding module becomes opaque to blind the camera module. A shielding assembly is also provided.

12 Claims, 6 Drawing Sheets

SHIELDING ASSEMBLY AND ELECTRONIC DEVICE EMPLOYING SAME

BACKGROUND

1. Technical Field

The present disclosure relates to a shielding assembly for protecting a camera module of an electronic device, especially to a shielding assembly and an electronic device employing same.

2. Description of Related Art

Electronic devices such as mobile phones have camera modules. A housing of the electronic device defines a camera hole for the camera module. A transparent piece (e.g., glass) is mounted in the camera hole for allowing access for light and to protect the camera parts from contamination by dust and water. The camera module can be clearly observed by a user of the electronic device through the glass piece. However, the glass piece affects an appearance of the electronic device to some extent.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
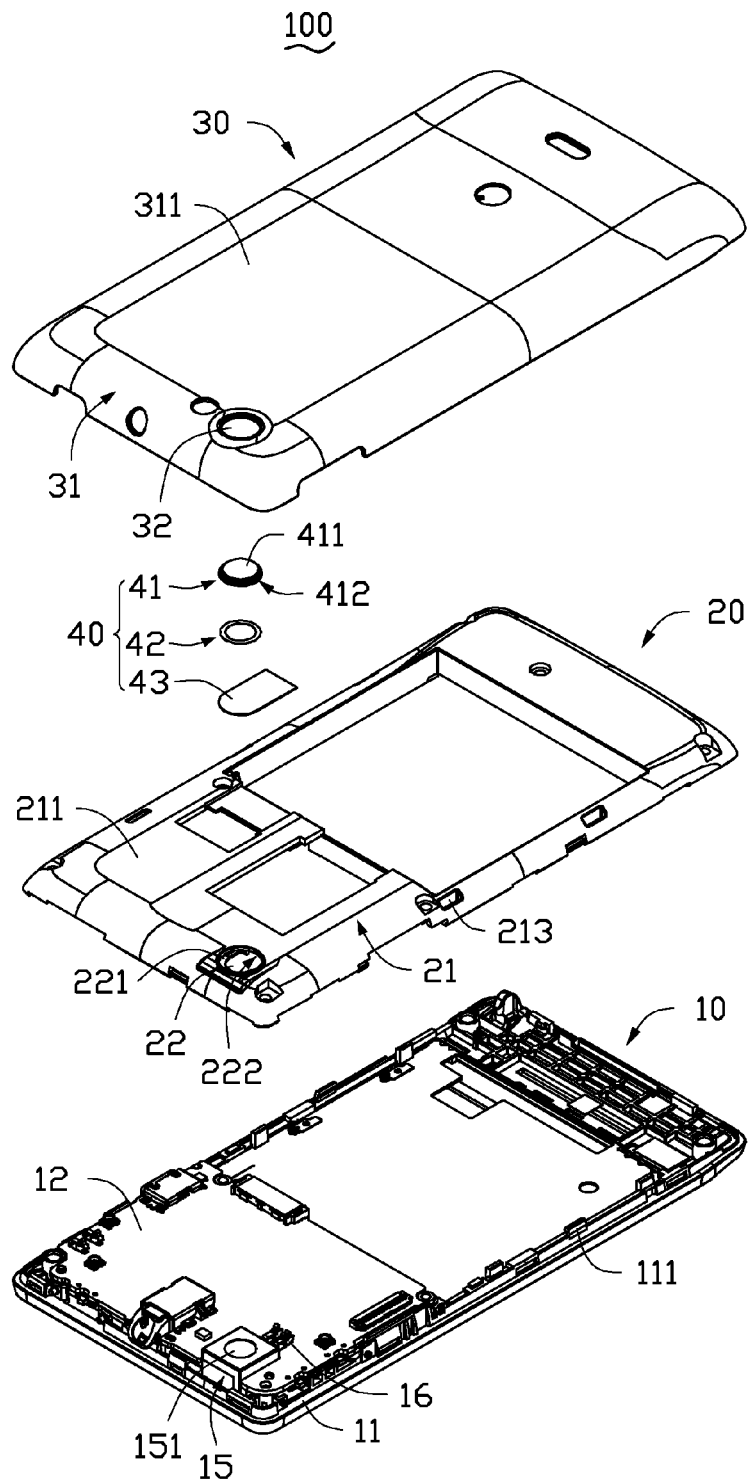
FIG. 1 is an exploded view of an exemplary embodiment of an electronic device employing a shielding assembly.

FIG. 1 is a shielding assembly 40 according to an exemplary embodiment. The shielding assembly 40 is applied to an electronic device 100, such as a mobile phone, a tablet computer, or a notebook computer, having a camera module 15. The electronic device 100 includes a main body 10, a first housing 20, a second housing 30, and the shielding assembly 40. The first housing 20 and the second housing 30 are both mounted on the main body 10, and the first housing 20 is located between the second housing 30 and the main body 10. In the present embodiment, the shielding assembly 40 is mounted in the electronic device 100 for covering the camera module 15.

The main body 10 includes a panel 11, a circuit board 12 mounted on the panel 11, a camera module 15 mounted on the circuit board 12, and two metal pieces 16. The camera module 15 is electrically connected to the circuit board 12. The camera module 15 includes a camera lens 151. The two metal pieces 16 are arranged on the circuit board 12 adjacent to the camera module 15. The panel 11 includes several latches 111 on a peripheral edge.

Figure 2:
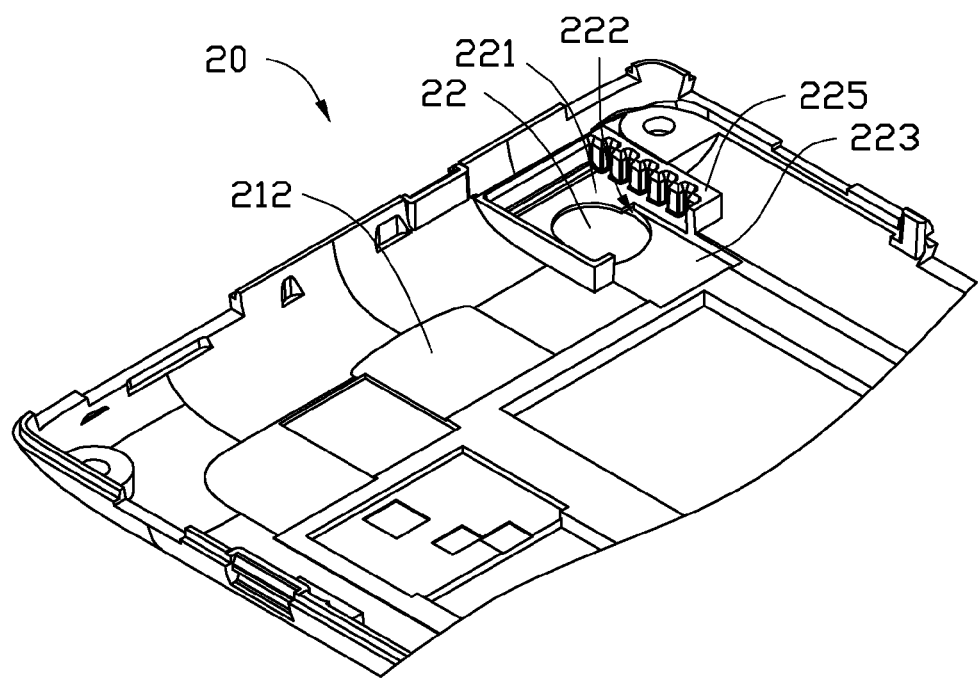
FIG. 2 is an isometric view of a first housing of the electronic device shown in FIG. 1.
Figure 3:
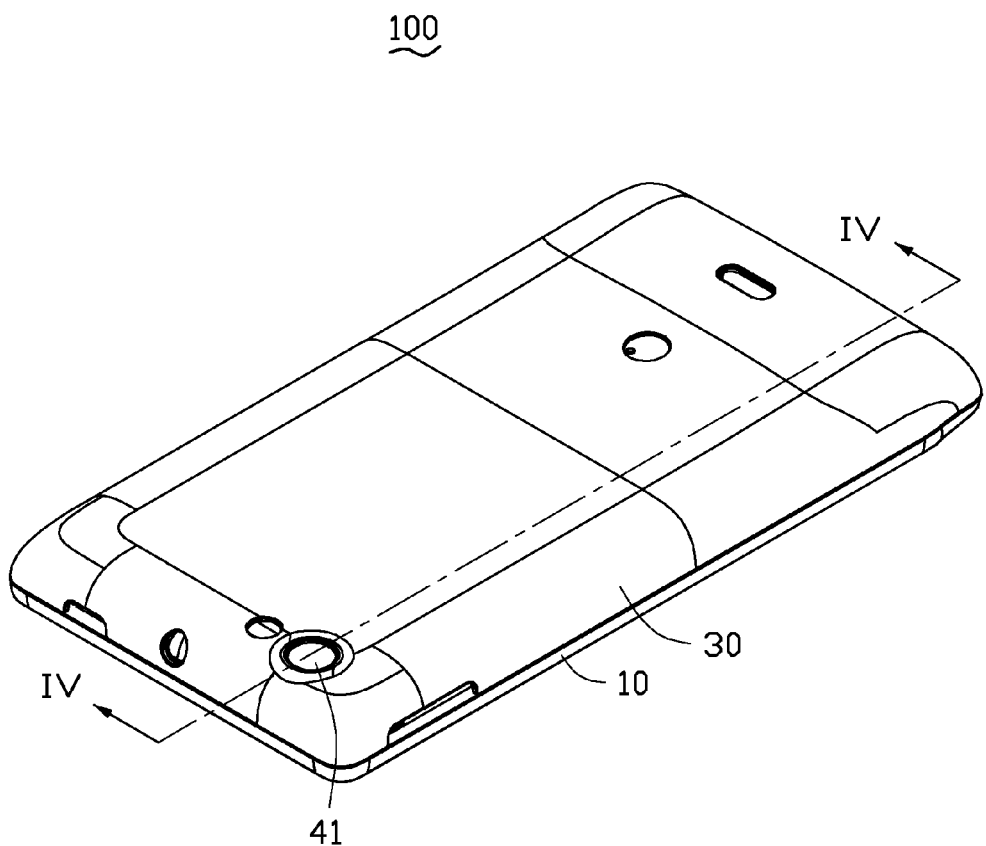
FIG. 3 is an assembled view of the electronic device and the shielding assembly of FIG. 1.

FIG. 2 shows that the first housing 20 includes a first board 21 and a hole 22. The first board 21 includes a front surface 211, a back surface 212, and several slots 213 on a peripheral edge corresponding to the latches 111 for latching the first housing 20 to the main body 10. The hole 22 is defined in the first board 21, corresponding to the camera module 15. A clasp portion 221 is protruding from a peripheral edge surrounding the hole 22 towards a center of the hole 22, on the back surface 212. The clasp portion 221 defines an opening 222 by cutting out a part of the clasp portion 221, the opening 222 faces a central portion of the first board 21. The back surface 212 defines a receiving groove 223 communicating with the opening 222. The back surface 212 further includes a protruding blocking board 225, beside the hole 22 and the receiving groove 223 for securing the camera module 15.

The second housing 30 may be a housing or a battery cover for the electronic device. The second housing 30 includes a second board 31 and a window 32. The second board 31 includes an outer surface 311. The window 32 aligns with the hole 22 and has a smaller diameter than that of the hole 22. Another surface of the second housing 30, opposite to the outer surface 311, is assembled together with the front surface 211 of the first housing 20.

Figure 5:
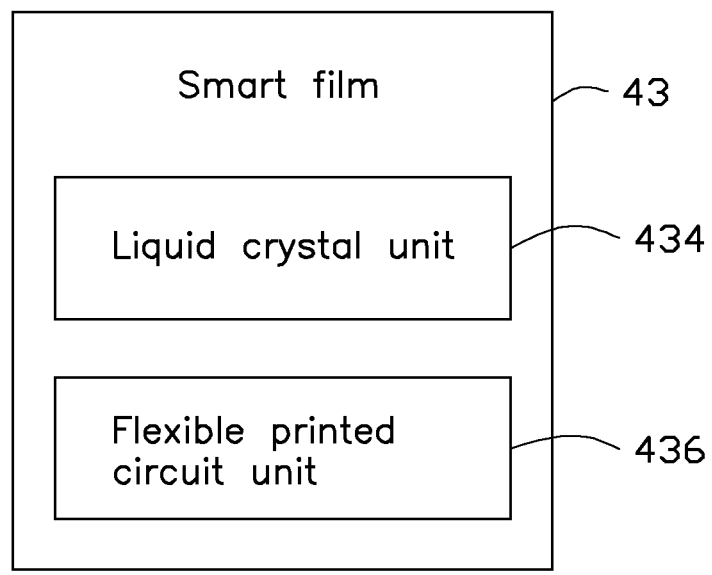
FIG. 5 is a schematic functional diagram of the smart film of the shielding assembly shown in FIG. 1.

The shielding assembly 40 includes a window glass 41, an adhesive 42, and a smart film 43. The window glass 41 is a piece of circular stepped-shaped glass, and includes an external surface 411 and an internal surface 412. The window glass 41 is secured in the window 32, with the external surface 411 disposed on the outer surface 311. The adhesive 42 is an annular double-side adhesive tape, which is adhered between the internal surface 412 of the window glass 41 and the smart film 43. The smart film 43 includes a liquid crystal unit 434 (shown in FIG. 5) and a flexible printed circuit unit 436 (shown in FIG. 5). The smart film 43 includes an arcuate end and a connecting end 432. The arcuate end is aligned with and is connected to the internal surface 412 of the window glass 41 by adhesive 42. The flexible printed circuit unit 436 of the connecting end 432 is electrically connected to the metal piece 16 on the circuit board 12 to electrically connect the smart film 43 and the circuit board 12.

Figure 4:
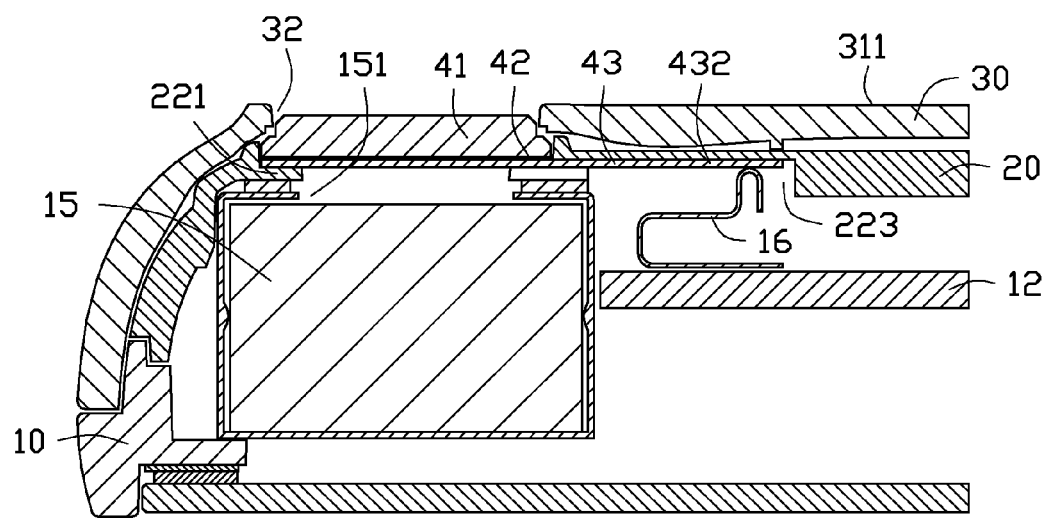
FIG. 4 is a cross-sectioned view of the electronic device taken along an IV-IV line shown in FIG. 3.

FIG. 4 shows that in assembly, the shielding assembly 40 is mounted to the first housing 20, with the arcuate end of the smart film 43 being inserted into the hole 22 via the receiving groove 223 and the opening 222 to assemble the window glass 41 into the hole 22. At this time, the arcuate end of the smart film 43 resists the clasp portion 221 and is adhered to the clasp portion 221 by a double-side adhesive between the smart film 43 and the clasp portion 221. The connecting end 432 is inserted into the receiving groove 223. After that, the first housing 20 is mounted to the main body 10, wherein the connecting end 432 resists the metal piece 16 and is secured by the metal piece 16, therefore, the shielding assembly 40 is secured between the first housing 20 and the main body 10. The camera lens 151 aligns with the hole 22, the smart film 43, and the window glass 41. Finally, the second housing 30 is mounted to the front surface 211 of the first housing 20, the window glass 41 is received in the window 31, and the external surface 411 is coplanar with the outer surface 311.

When the camera module 15 is not in use, the smart film 43 receives no electricity, and light axes of liquid crystals of the liquid crystal unit 434 are arranged non-directionally. Thus, light is scattered by the liquid crystals after entering the smart film 43, which makes the smart film 43 opaque. When seen from outside of the window glass 41, it looks like a black glass, and the camera lens 151 cannot be seen. Therefore, the appearance of window glass 41 is similar to the appearance of the second housing 30, which is black, which makes the appearance of the electronic device 100 appealing.

When the camera module 15 is in use, the smart film 43 receives electricity from the circuit board 12 via the metal piece 16 and the connecting end 432. The light axes rotates with a direction of electric field, which allows light to pass through and makes the smart film 43 become transparent. The camera lens 151 can be seen from outside and can capture images.

Figure 6:
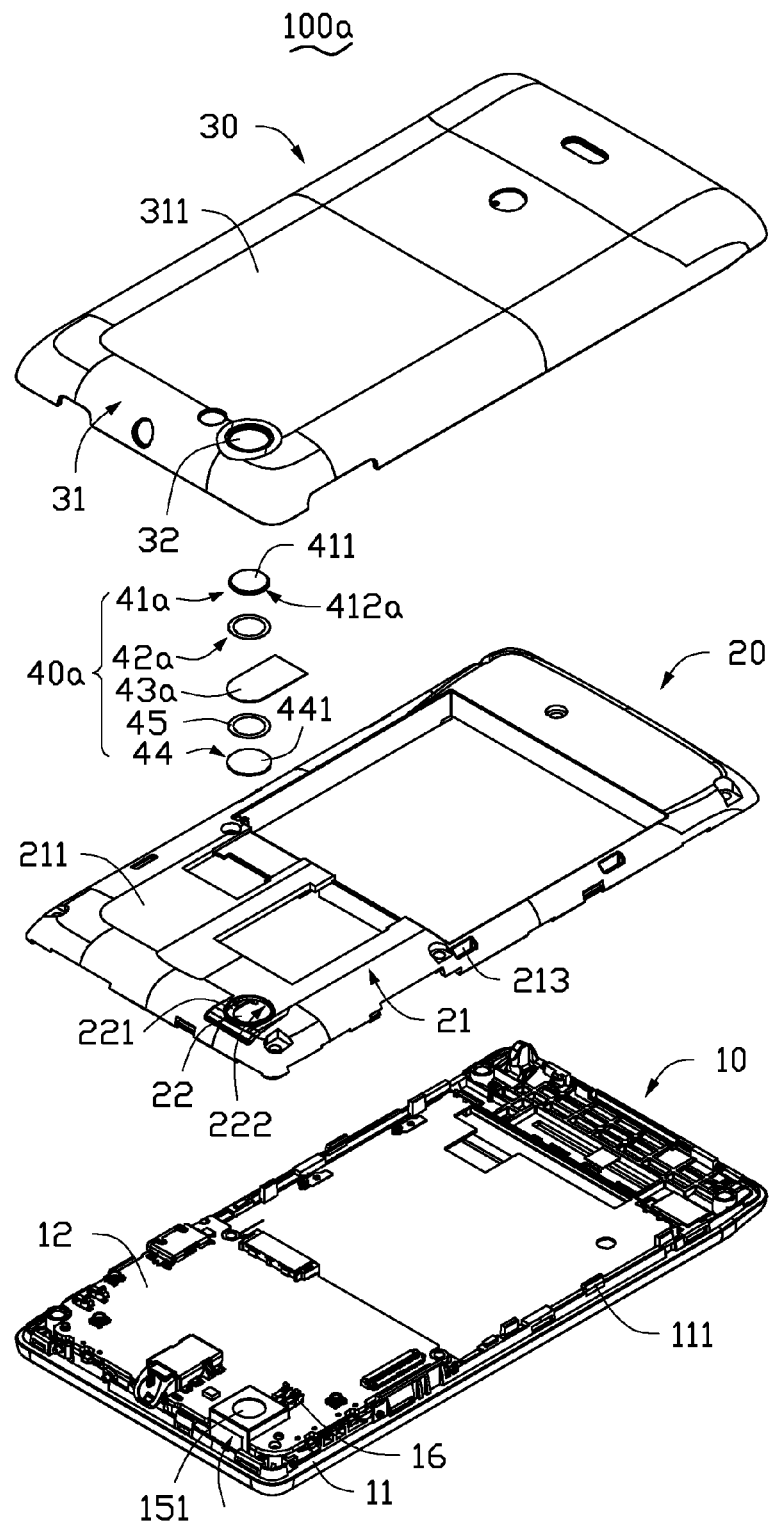
FIG. 6 is an exploded view of another exemplary embodiment of the electronic device and the shielding assembly.

FIG. 6 shows a second embodiment of the electronic device 100a, which has a similar structure to the first embodiment, and differs from the first embodiment primarily in structure of the shielding assembly 40a. The shielding assembly 40a includes window glasses 41a, 44, adhesives 42a, 45, and a smart film 43a. The window glass 41a includes an internal surface 412a, the window glass 44 includes a mounting surface 441. The opposite surfaces of the smart film 43a are adhered to the internal surface 412a of the window glass 41a and the mounting surface 441 of the window lens 44 by the adhesive 42a, 45 respectively. Thus, the smart film 43a is secured between the window glass 41a and 44.

In another embodiment, the first housing 20 is the housing of the electronic device 100, the window glass 41 is directly secured in the hole 22.

The structure of the shielding assembly 40 is simple, which will not add any extra structure to the housing. When smart film 43 receives no electricity, it is opaque, which is appealing with the housing of the electronic device 100.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. An electronic device comprising:
   a camera module;
   a shielding assembly including at least one window glass and a smart film mounted to the window glass, the smart film having an arcuate end and a connecting end; and
   a first housing comprising:
     a receiving groove;
     a hole corresponding to the camera module; and
     a clasp portion protruded from a peripheral edge of the hole; the clasp defining an opening;
     the arcuate end of the smart film configured to resist the clasp portion;
     the connecting end of the smart film configured to pass through the opening and be received in the receiving groove; and
   a circuit board comprising a metal piece supporting the connecting end of the smart film to secure the smart film;
   wherein the shielding assembly covers the camera module by turning opaque, if the camera module is in use, the shielding assembly is provided with electricity, and changes transparent for allowing light to enter; if the shielding assembly is not being provided with electricity, the shielding module becomes opaque to block the view of the camera module.

2. The electronic device as claimed in claim 1, wherein the window glass includes an internal surface and an external surface, the smart film is mounted on the internal surface.

3. The electronic device as claimed in claim 2, further comprising an adhesive, wherein the smart film is adhered to the internal surface via the adhesive.

4. The electronic device as claimed in claim 3, further comprising a main body and the first housing mounted on the main body, wherein the first housing includes a front surface and a back surface, the receiving groove is defined in the back surface.

5. The electronic device as claimed in claim 4, wherein the clasp portion is protruded from a peripheral edge of the hole on the back surface.

6. The electronic device as claimed in claim 5, wherein the smart film includes a connecting end located in the receiving groove.

7. The electronic device as claimed in claim 6, wherein the connecting end is supported by the metal piece, the smart film is electrically connected to the circuit board via the connecting end and the metal piece.

8. The electronic device as claimed in claim 7, further comprising a second housing, wherein the second housing defines a window.

9. The electronic device as claimed in claim 8, wherein the camera module includes a camera lens corresponding to the window and the smart film in the hole.

10. The electronic device as claimed in claim 1, wherein the shielding assembly includes two window glasses, one of the window glasses includes an internal surface and an external surface, the other window glass includes a mounting surface corresponding to the internal surface.

11. The electronic device as claimed in claim 10, wherein the smart film is mounted between the internal surface and the mounted surface.

12. The electronic device as claimed in claim 1, wherein the smart film includes a liquid crystal unit and a flexible printed circuit unit, the flexible printed circuit unit controls whether electricity is applied, thus to control lights transmission in the liquid crystal unit.

* * * * *